United States Patent
Kim

(10) Patent No.: US 9,885,912 B2
(45) Date of Patent: Feb. 6, 2018

(54) LIQUID CRYSTAL DISPLAY AND MANUFACTURING METHOD THEREOF

(71) Applicant: SAMSUNG DISPLAY CO., LTD., Yongin-si, Gyeonggi-do (KR)

(72) Inventor: Tae Gyun Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 99 days.

(21) Appl. No.: 15/011,382

(22) Filed: Jan. 29, 2016

(65) Prior Publication Data
US 2016/0363815 A1 Dec. 15, 2016

(30) Foreign Application Priority Data

Jun. 12, 2015 (KR) .......................... 10-2015-0083458

(51) Int. Cl.
| G02F 1/1333 | (2006.01) |
| G02F 1/1335 | (2006.01) |
| G02F 1/1368 | (2006.01) |
| G02F 1/1343 | (2006.01) |
| G02F 1/1341 | (2006.01) |

(52) U.S. Cl.
CPC ...... *G02F 1/133606* (2013.01); *G02F 1/1341* (2013.01); *G02F 1/1368* (2013.01); *G02F 1/13439* (2013.01); *G02F 1/133377* (2013.01); *G02F 1/133512* (2013.01); *G02F 1/133524* (2013.01)

(58) Field of Classification Search
None
See application file for complete search history.

(56) References Cited

U.S. PATENT DOCUMENTS

| 9,606,389 | B2 * | 3/2017 | Hiratsuka | ......... G02F 1/133345 |
| 2006/0087490 | A1 * | 4/2006 | Ding | ................. G02F 1/133377 |
| | | | | 345/107 |
| 2014/0125905 | A1 * | 5/2014 | Matsui | ............. G02F 1/133377 |
| | | | | 349/43 |
| 2014/0204578 | A1 * | 7/2014 | Kim | ....................... F21V 11/16 |
| | | | | 362/235 |
| 2014/0375937 | A1 * | 12/2014 | Lee | ................... H01L 29/66742 |
| | | | | 349/106 |
| 2017/0023827 | A1 * | 1/2017 | Tai | .................... G02F 1/133603 |
| 2017/0059916 | A1 * | 3/2017 | Park | ................. G02F 1/133377 |

FOREIGN PATENT DOCUMENTS

| KR | 10-2014-0091808 A | 7/2014 |
| KR | 10-2014-0137958 A | 12/2014 |
| KR | 10-2014-0146940 A | 12/2014 |
| KR | 10-2014-0147354 A | 12/2014 |
| KR | 10-1476919 B1 | 12/2014 |
| KR | 10-2015-0007175 A | 1/2015 |
| KR | 10-2015-008758 A | 1/2015 |

* cited by examiner

*Primary Examiner* — James Dudek
(74) *Attorney, Agent, or Firm* — Innovation Counsel LLP

(57) ABSTRACT

A liquid crystal display according to an exemplary embodiment includes: a substrate; a liquid crystal layer positioned on the substrate and formed with a plurality of microcavities including liquid crystal molecules; a roof layer positioned on the liquid crystal layer; a capping layer positioned on the roof layer; and a light source positioned on the capping layer and positioned between the plurality of microcavities.

15 Claims, 21 Drawing Sheets

LIQUID CRYSTAL DISPLAY AND MANUFACTURING METHOD THEREOF

RELATED APPLICATIONS

This application claims priority to and the benefit of Korean Patent Application No. 10-2015-0083458 filed in the Korean Intellectual Property Office on Jun. 12, 2015, the disclosure of which is incorporated herein by reference in its entirety.

BACKGROUND

1. Field

The present disclosure relates generally to a liquid crystal display and a manufacturing method thereof.

2. Description of the Related Art

A liquid crystal display panel, which is one of the most common types of flat panel displays currently in use, includes two sheets of substrates with field generating electrodes such as a pixel electrode and a common electrode, and a liquid crystal layer interposed between the two substrates. The liquid crystal display generates electric fields in the liquid crystal layer by applying voltages to the field generating electrodes, determines the alignment of liquid crystal molecules of the liquid crystal layer by the generated electric fields, and controls polarization of incident light, thereby displaying images.

A technique of forming a cavity in a pixel and filling the cavity with liquid crystal molecules to implement a liquid crystal display has been developed. Although two sheets of substrates are used in a conventional liquid crystal display, constituent elements are formed on one substrate, thereby reducing weight and thickness of the liquid crystal display.

The above information disclosed in this Background section is only for enhancement of understanding of the background of the present disclosure, therefore it may contain information that does not form a prior art that is already known to a person of ordinary skill in the art.

SUMMARY

The present disclosure provides a display device manufactured by using one substrate. The present display device can be made to be slim and is adequate for a large-size display device.

A liquid crystal display, according to an exemplary embodiment, includes: a substrate; a liquid crystal layer positioned on the substrate and formed with a plurality of microcavities including liquid crystal molecules; a roof layer positioned on the liquid crystal layer; a capping layer positioned on the roof layer; and a light source positioned on the capping layer and positioned between the plurality of microcavities.

A light guide panel covering the light source and the capping layer may be further included.

A diffuser sheet positioned between the light source and the light guide panel and a reflection sheet formed on the light guide panel may be further included.

A light blocking member positioned between the capping layer and the light source may be further included.

The light guide panel may be patterned at a position corresponding to the light source.

A first diffuser sheet positioned between the light source and the light guide panel, and a second diffuser sheet formed on the light guide panel, may be further included.

A thin film transistor positioned on the substrate, a pixel electrode connected to the thin film transistor, an upper insulating layer positioned on the roof layer, and a lower insulating layer positioned under the roof layer and facing the pixel electrode based on the microcavities may be further included.

The light source may be formed along a liquid crystal inlet formed along a direction that a gate line connected to the thin film transistor extends.

A manufacturing method of a liquid crystal display, according to an exemplary embodiment, includes: forming a thin film transistor on a substrate; forming a pixel electrode on the thin film transistor; forming a sacrificial layer on the pixel electrode; forming a roof layer on the sacrificial layer; removing the sacrificial layer to form a plurality of microcavities; injecting a liquid crystal material into the plurality of microcavities; forming a capping layer covering a liquid crystal inlet formed between the plurality of microcavities; and forming a light source positioned on the capping layer and disposed in a liquid crystal inlet formed between the plurality of microcavities.

The method may further include forming a light guide panel covering the light source and the capping layer.

The method may further include forming a diffuser sheet between the light source and the capping layer before forming the light guide panel.

The method may further include forming a reflection sheet on the light guide panel after forming the light guide panel.

The method may further include forming a first diffuser sheet on the light source and the capping layer before forming the light guide panel, and forming a second diffuser sheet on the light guide panel after forming the light guide panel.

The method may further include forming a light blocking member positioned on the capping layer and facing the liquid crystal inlet formed between the plurality of microcavities after forming the capping layer.

The liquid crystal inlet may be formed along a direction in which a gate line connected to the thin film transistor extends.

As described above, according to an exemplary embodiment, in the display device manufactured by using one substrate, a light source is positioned between the plurality of microcavities including the liquid crystal molecules such that the thin film and the large size of the display device may be realized.

DETAILED DESCRIPTION

Figure 1:
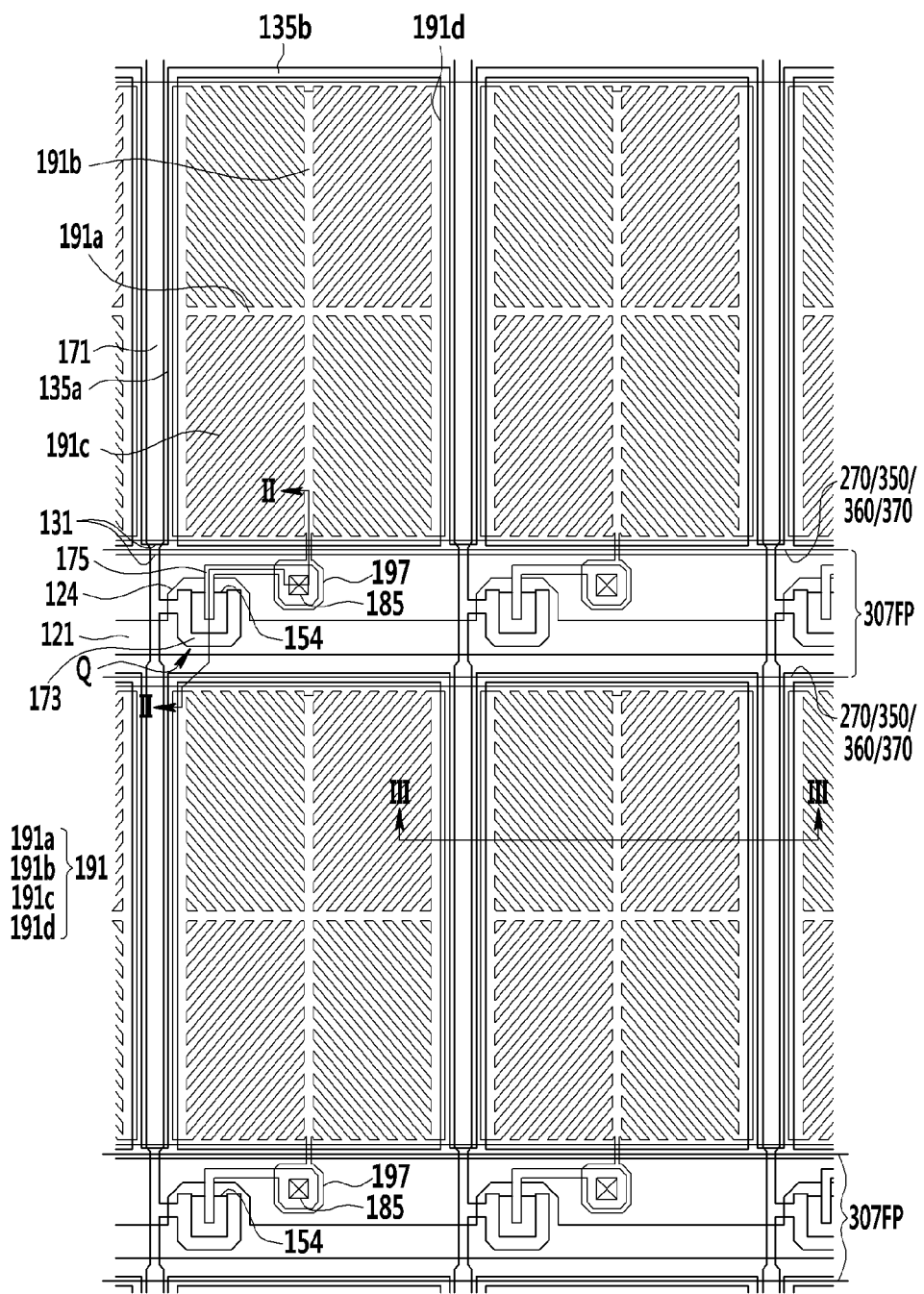
FIG. 1 is a top plan view of a liquid crystal display according to an exemplary embodiment.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. Throughout the specification, components denoted by the same reference numerals are the same components.

Figure 2:
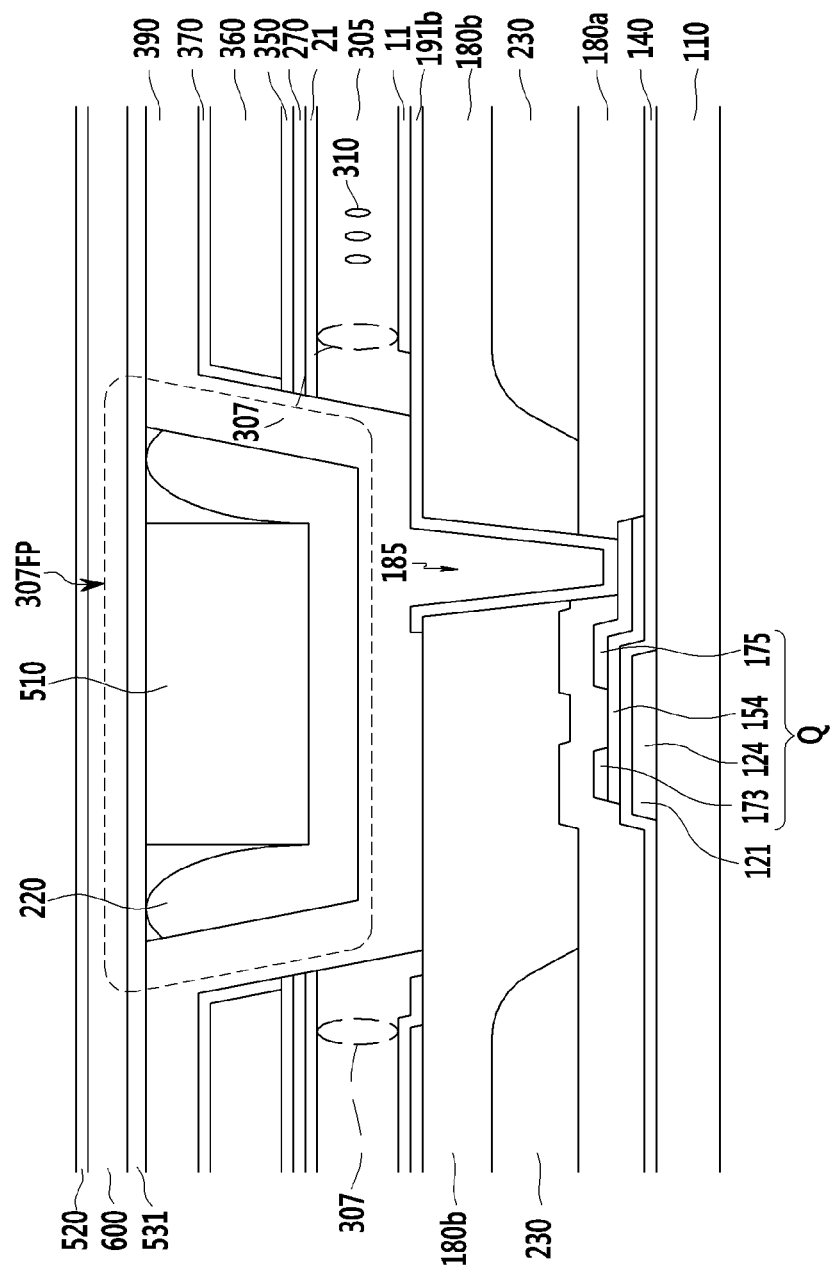
FIG. 2 is a cross-sectional view taken along a line II-II of FIG. 1.
Figure 3:
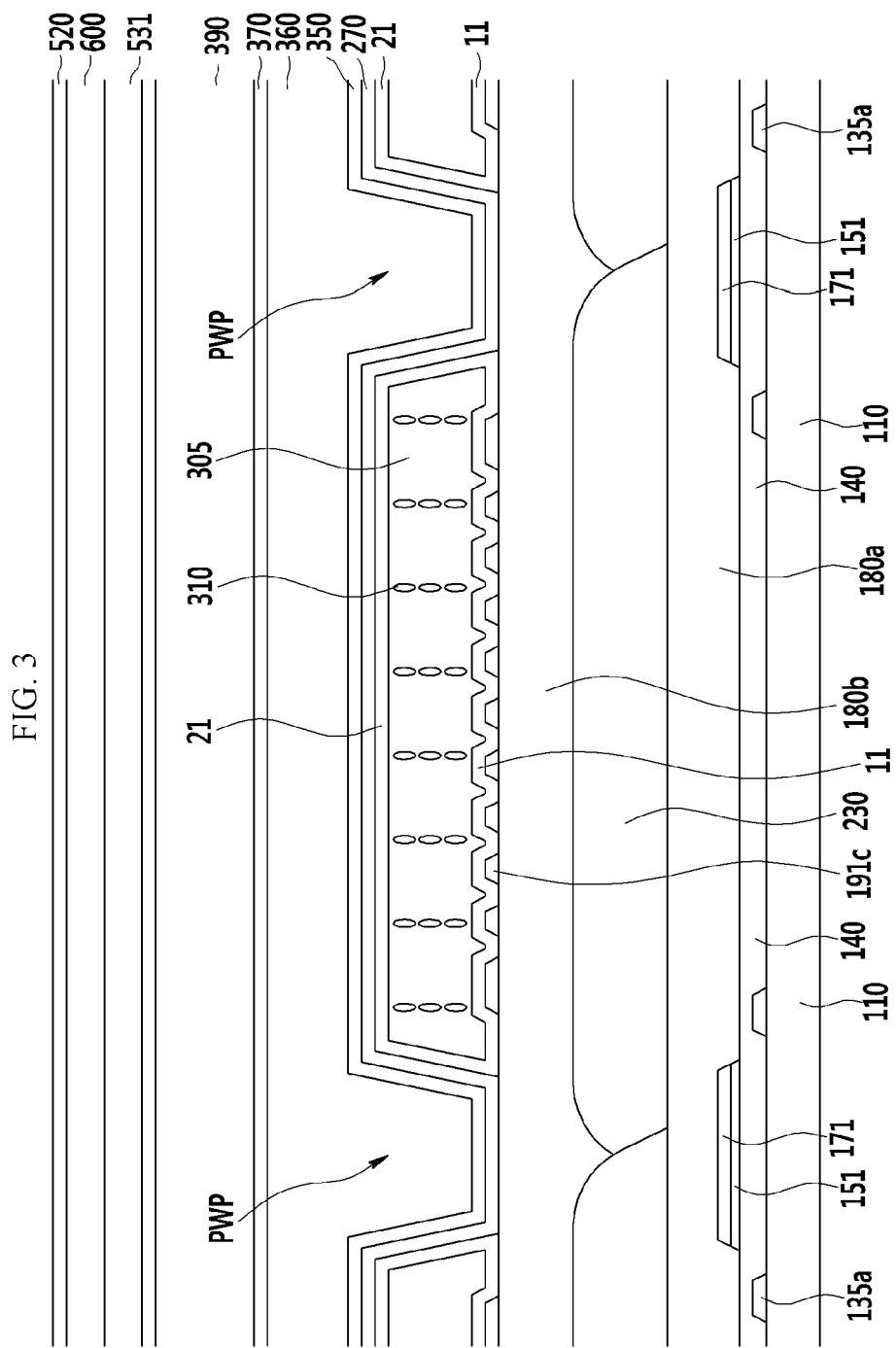
FIG. 3 is a cross-sectional view taken along a line of FIG. 1.
Figure 4:
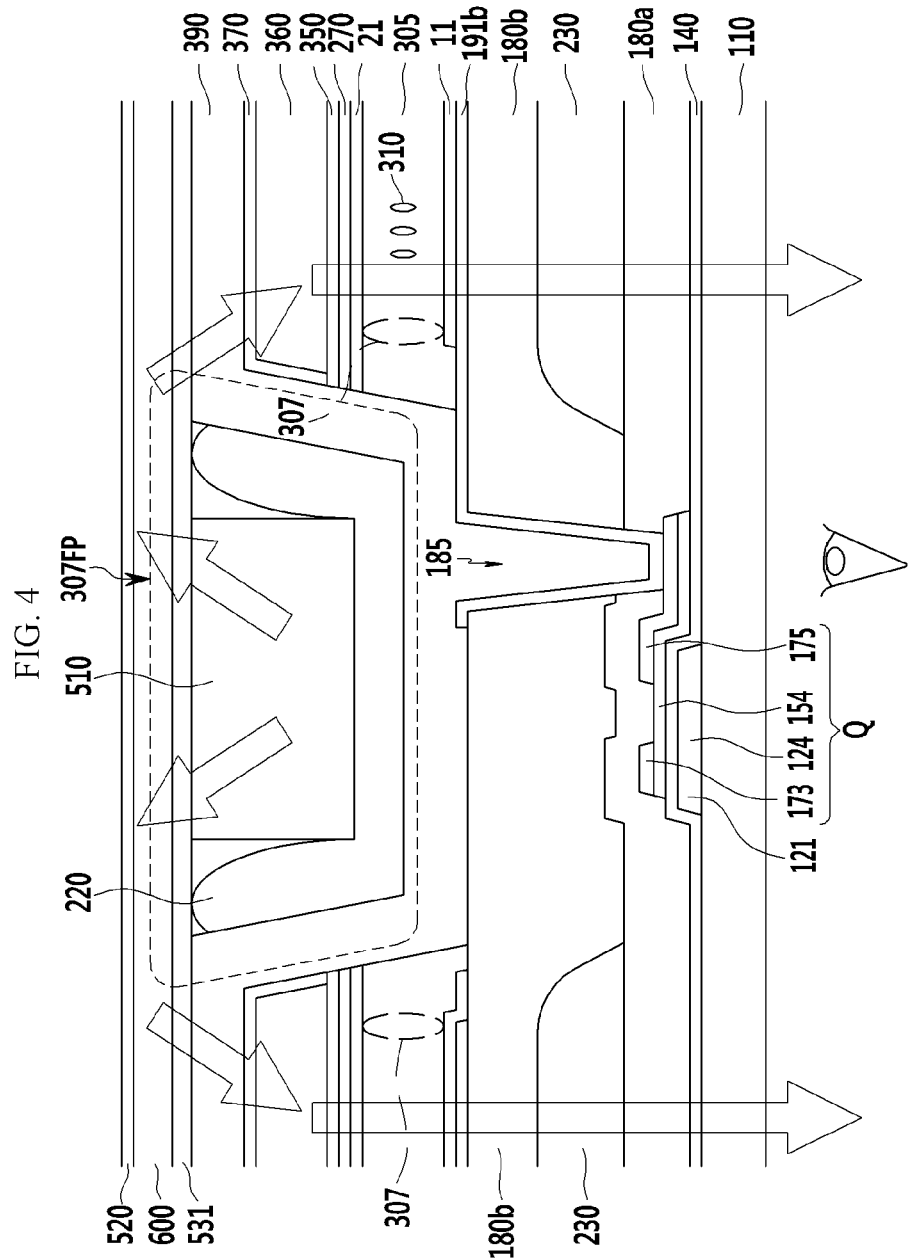
FIG. 4 is a view to explain a movement path of light in FIG. 2.

FIG. 1 is a top plan view of a liquid crystal display according to an exemplary embodiment. FIG. 2 is a cross-sectional view taken along a line II-II of FIG. 1. FIG. 3 is a cross-sectional view taken along a line of FIG. 1. FIG. 4 is a view to explain a movement path of light in FIG. 2. FIG. 1 shows 2 by 2 pixels as a part of a plurality of pixels respectively corresponding to a plurality of microcavities 305, and these pixels may be repeatedly arranged up, down, left, or right in the liquid crystal display according to an exemplary embodiment.

Referring to FIG. 1 to FIG. 4, a gate line 121 and a storage electrode line 131 are formed on an insulating substrate 110 that is formed of transparent glass or plastic. The gate line 121 includes a gate electrode 124. The storage electrode line 131 is mainly extended in a horizontal direction, and transfers a predetermined voltage such as a common voltage Vcom. The storage electrode line 131 includes a pair of vertical storage electrode portions 135a substantially extended to be perpendicular to the gate line 121, and a horizontal storage electrode portion 135b connecting ends of the pair of vertical storage electrode portions 135a to each other. The storage electrode portions 135a and 135b have a structure surrounding a pixel electrode 191.

A gate insulating layer 140 is formed on the gate line 121 and the storage electrode line 131. A semiconductor layer 151 positioned at a lower portion of a data line 171, and a semiconductor layer 154 positioned at a lower portion of a source/drain electrode and at a channel portion of a thin film transistor Q are formed on the gate insulating layer 140. A plurality of ohmic contacts may be formed on each of the semiconductor layers 151 and 154, and between the data line 171 and the source/drain electrode, but this is omitted in the drawings.

Data conductors including a source electrode 173, a data line 171 connected with the source electrode 173, and a drain electrode 175 are formed on each of the semiconductor layers 151 and 154 and the gate insulating layer 140. Here, the data line 171 may have a function of a light blocking member for preventing light leakage, and a width of the data line 171 may be equal to or wider than a width of a partition wall part PWP. The gate electrode 124, the source electrode 173, and the drain electrode 175 form the thin film transistor Q together with the semiconductor layer 154, and a channel of the thin film transistor Q is formed on the portion of the semiconductor layer 154 between the source electrode 173 and the drain electrode 175.

A first interlayer insulating layer 180a is formed on the data conductors and an exposed portion of the semiconductor layer 154. The first interlayer insulating layer 180a may include an inorganic insulating material such as a silicon nitride (SiNx) and a silicon oxide (SiOx), or an organic insulating material.

A color filter 230 is formed on the first interlayer insulating layer 180a. The color filter 230 may display one of primary colors, such as three primary colors including red, green, and blue. However, the colors are not limited to the three primary colors including red, green, and blue, and the color filter 230 may also display a color of a cyan-based color, a magenta-based color, a yellow-based color, and a white-based color. The color filter 230 may be formed of materials displaying different colors for each adjacent pixel.

A second interlayer insulating layer 180b covering the color filter 230 is formed on the color filter 230. The second interlayer insulating layer 180b may include an inorganic insulating material, such as a silicon nitride (SiNx) and a silicon oxide (SiOx), or an organic insulating material.

A contact hole 185 exposing the drain electrode 175 is formed in the color filter 230 and the interlayer insulating layers 180a and 180b. The pixel electrode 191 is positioned on the second interlayer insulating layer 180b. The pixel electrode 191 may be formed of a transparent conductive material such as ITO, IZO, or the like. The shape of the pixel electrode 191 is a rectangular shape, and includes a cross stem part including a horizontal stem part 191a and a vertical stem part 191b that intersects the horizontal stem part 191a. In addition, the pixel electrode 191 is divided into four sub-regions by the horizontal stem part 191a and the vertical stem part 191b, wherein each of the sub-regions includes a plurality of fine branch parts 191c. In addition, in the present exemplary embodiment, the pixel electrode 191 may further include outer side stem parts 191d connecting with the fine branch parts 191c to each other at left and right outer sides. In the present exemplary embodiment, the outer side stem parts 191d may be positioned at the left and right outer sides of the pixel electrode 191 or may be positioned to be extended up to an upper portion or down to a lower portion of the pixel electrode 191.

The fine branch parts 191c of the pixel electrode 191 form an angle of approximately 40 to 45 degrees with respect to the gate line 121 or the horizontal stem part 191a. In addition, the fine branch parts 191c of two neighboring sub-regions may be orthogonal to each other. Further, widths of the fine branch parts may gradually change or intervals between the fine branch parts 191c may be different from each other.

The pixel electrode 191 includes an extension part 197 connected to the pixel electrode 191 at a lower end of the vertical stem part 191b and having a wider area than that of the vertical stem part 191b. The pixel electrode is physically and electrically connected to the drain electrode 175 through the contact hole 185 at the extension part 197, and receives a data voltage applied from the drain electrode 175.

The descriptions of the color filter 230, the thin film transistor Q and the pixel electrode 191 stated herein are only an example, and a position of the color filter 230, a structure of the film transistor Q, and a design of the pixel electrode 191 are not limited to the structures described in the present exemplary embodiment, but may be modified to improve side visibility.

A lower alignment layer 11 is formed on the pixel electrode 191, and the lower alignment layer 11 may be a vertical alignment layer. The lower alignment layer 11 may include at least one of generally used materials as a liquid crystal alignment layer such as polyamic acid, polysiloxane, or polyimide.

An upper alignment layer 21 is provided at a portion facing the lower alignment layer 11, and a microcavity 305 is formed between the lower alignment layer 11 and the upper alignment layer 21. The microcavity 305 forms a liquid crystal layer. A liquid crystal material 310 including liquid crystal molecules is injected into the microcavity 305, and the microcavity 305 has an inlet part 307. A plurality of microcavities 305 may be formed along a column direction of the pixel electrode 191, that is, the vertical direction. In the present exemplary embodiment, the alignment material forming the alignment layers 11 and 21 and the liquid crystal material 310 including the liquid crystal molecules may be injected into the microcavity 305 using a capillary force. In the present exemplary embodiment, the lower alignment layer 11 and the upper alignment layer 21 are merely differentiated depending on a position, and may be connected to each other as shown in FIG. 3. The lower alignment layer 11 and the upper alignment layer 21 may be simultaneously formed.

The microcavity 305 is partitioned in a vertical direction by the liquid crystal injecting parts 307FP positioned at portions overlapped with the gate line 121 to form the plurality of microcavities 305. The plurality of microcavities 305 may be formed along the column direction of the pixel electrode 191, that is, the vertical direction. The liquid crystal injecting parts 307FP are formed in a region where a trench is formed in the manufacturing process of the liquid crystal display according to an exemplary embodiment. In the final structure, as shown in FIG. 2, the liquid crystal injecting parts 307FP may be formed in a region where a capping layer 390, a light blocking member 220, and the like are covered.

In addition, the microcavity 305 is divided in the horizontal direction by a partition wall part PWP that will be described later, thereby forming the plurality of microcavities 305. The plurality of microcavities 305 may be formed along the row direction of the pixel electrode 191, in other words, the horizontal direction in which the gate line 121 extends. The formed microcavities 305 may respectively correspond to one or more pixel areas, and the pixel areas may correspond to a region displaying an image.

A common electrode 270 and a lower insulating layer 350 are positioned on the upper alignment layer 21. The common electrode 270 receives the common voltage, and generates an electric field together with the pixel electrode 191 to which the data voltage is applied to determine an inclination direction in which the liquid crystal molecules 310 positioned at the microcavity 305 between the two electrodes. The common electrode 270 and the pixel electrode 191 form a capacitor to maintain the received voltage even after the thin film transistor is turned off. The lower insulating layer 350 may be formed of a silicon nitride (SiNx) or a silicon oxide (SiOx). In the present exemplary embodiment, it is described that the common electrode 270 is formed on the microcavity 305, but in another exemplary embodiment, the common electrode 270 is formed under the microcavity 305, so that liquid crystal display can be driven in a coplanar electrode (CE) mode.

A roof layer 360 is disposed on the lower insulating layer 350. The roof layer 360 serves as a support to form the microcavity 305, which is a space between the pixel electrode 191 and the common electrode 270. The roof layer 360 may include silicon oxycarbide (SiOC), a photoresist, or other organic materials.

An upper insulating layer 370 is disposed on the roof layer 360. The upper insulating layer 370 may contact the upper surface of the roof layer 360. As shown in FIG. 2, the upper insulating layer 370 may cover side portions of the roof layer 360. As a modified example, side walls of the lower insulating layer 350, the roof layer 360, and the upper insulating layer 370 may be formed to be substantially equally aligned with each other.

The capping layer 390 is disposed on the upper insulating layer 370. The capping layer 390 includes an organic material or an inorganic material. The capping layer 390 may be disposed in the liquid crystal injecting part 307FP as well as on the upper insulating layer 370. In this case, the capping layer 390 may cover the inlet part 307 of the microcavity 305 exposed by the liquid crystal injecting part 307FP. In the present exemplary embodiment, the capping layer 390 extends from the upper insulating layer 370, thereby forming a recessed structure in the liquid crystal injecting parts 307FP. Although the present exemplary embodiment describes the case in which the liquid crystal material is removed from the liquid crystal injecting part 307FP, the liquid material remaining after being injected into the microcavity 305 may remain in the liquid crystal injecting part 307FP.

In the present exemplary embodiment, as shown in FIG. 3, the partition wall part PWP is formed between the microcavities 305 neighboring each other in the horizontal direction. The partition wall part PWP may be formed in a direction in which the data lines 171 are extended, and may be covered by the roof layer 360. The partition wall part PWP is filled with the common electrode 270, the lower insulating layer 350, the roof layer 360, and the upper insulating layer 370. These structures may form a partition wall to partition or define the microcavity 305. In the present exemplary embodiment, the partition wall part PWP is formed between the microcavities 305, therefore less stress may be generated when the substrate 110 is bent, and a deformation degree of a cell cap may be decreased.

In the present exemplary embodiment, as shown in FIG. 2, the light blocking member 220 is formed on the capping layer 390. The light blocking member 220 is formed of a material through which light does not pass. The light blocking member 220 covers the thin film transistor Q to prevent a light leakage current, thereby preventing a light source 510 that will be described later from being directly irradiated in a direction of the thin film transistor Q. The light blocking member 220 may be formed along a direction parallel to the gate line 121.

In the present exemplary embodiment, as shown in FIG. 2, the light source 510 is formed in the liquid crystal injecting part 307FP positioned between the microcavities 305 adjacent in the vertical direction. In this case, the light source 510 may be formed on the light blocking member 220. Here, the light source 510 may use a light emitting diode LED, however a kind of the light source is not limited thereto, and a cold cathode fluorescent lamp (CCFL) and the like may be used.

A light guide panel 600 is positioned on the light source 510 and the capping layer 390. The light guide panel 600 guides the light emitted from the light source 510 to be uniformly transmitted to a viewer. In this case, the light guide panel 600 may be a material including an acryl extrusion and is generally manufactured of a poly(methyl methacrylate) (PMMA) material having high light transmittance. In addition, a poly(methacrylstyrene) (MS) material having excellent heat resistance and moisture resistance compared to the PMMA may be used. The light guide panel 600 may be a wedge type plate or a flat type plate, but it is not limited thereto.

In the present exemplary embodiment, a diffuser sheet 531 for scattering the light emitted from the light source 510 and irradiated through the light guide panel 600 may be further included. In this case, the diffuser sheet 531 is positioned on a path of the light in a space between the light source 510 and the light guide panel 600.

The material of the diffuser sheet 531 may include at least one among a transparent silicon, a polycarbonate, and an acryl resin (PMMA). The diffuser sheet 531 may be made of a soft material, and the exemplary embodiment discloses, for example, a silicon material, and the like, but is not limited thereto, and any material that enables a light cycle may be used.

In the present exemplary embodiment, a reflection sheet 520 may be further included to prevent the light emitted from the light source 510 from escaping to the outside of the display device. The reflection sheet 520 reflects the light leaked in the opposite side of the display device so as to prevent the light emitted from the light source 510 from escaping to the outside, thereby changing the light path in a direction of the display device. When the light emitted from the light source 510 is emitted to the upper surface of the light guide panel 600, the reflection sheet 520 reflects the light to return to the light guide panel 600.

Referring to FIG. 4, the light emitted from the light source 510 is scattered through the diffuser sheet 531. The light scattered through the diffuser sheet 531 passes through the liquid crystal layer and the color filter 230 through the light guide panel 600, and is uniformly transmitted to a viewer through the substrate 110. In the present exemplary embodiment, the viewer may view the display device in a direction from the lower side of the substrate 110 toward the upper side. The light leaked from the display device to the opposite side of the viewer is reflected by the reflection sheet 520 and the light path of the leaked light is changed to the side of the display device, thereby being transmitted to the viewer without a loss of the light.

When forming a curved display device in which the light source 510 is formed under the substrate 110, the thickness of the display device may be increased. The increase in the thickness may apply an increased tension force to the display device that may cause a damage to the display device may. Further, an edge type display device in which the light source is disposed on an edge of the light guide panel 600 is difficult to apply to a large-sized display.

The display device according to an exemplary embodiment does not form the light source 510 under the substrate 110, but forms the light source 510 to be positioned between the microcavities 305 formed on the substrate 110 allowing the thickness of the display device to be reduced. Further, the reduced tension force applied to the display device makes the display device adequate to apply to a large-sized display. Although not shown, a polarizer may be formed between the capping layer 390 and the light guide panel 600.

Figure 5:
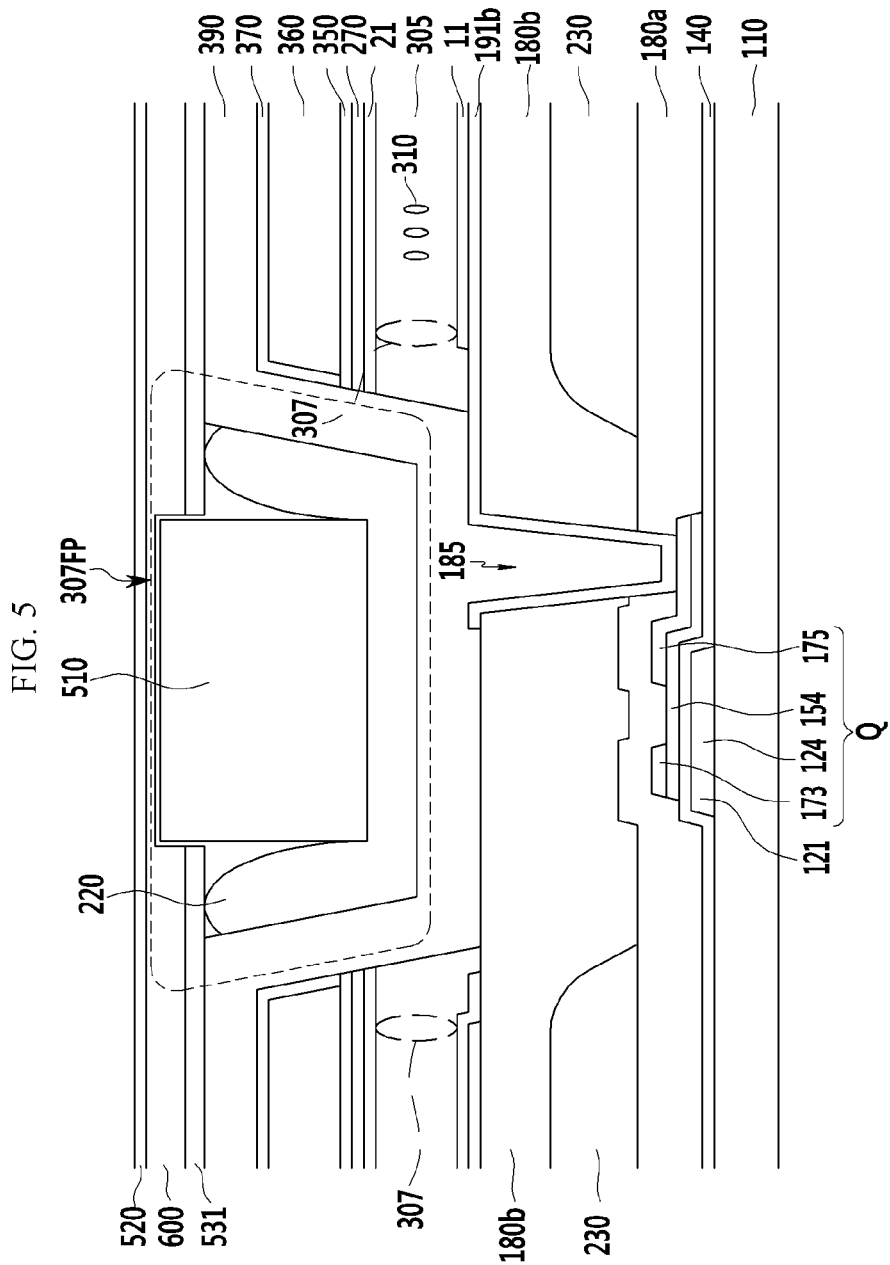
FIG. 5 is a cross-sectional view of a liquid crystal display according to an exemplary embodiment.

Next, another exemplary embodiment including other constituent elements will be described with reference to FIG. 5. The description of the same constituent elements as in the previous exemplary embodiment is omitted. FIG. 5 is a cross-sectional view of a liquid crystal display according to an exemplary embodiment. The light guide panel 600 according to an exemplary embodiment is patterned by a size of the light source 510 at a position corresponding to the light source 510. In the present exemplary embodiment, at least a portion of the light source 510 may be inserted to the patterned portion of the light guide panel 600. Accordingly, the light emitted from the light source 510 may enter the light guide panel 600 through a lateral surface of the light guide panel 600, thereby forming a planar light source.

Figure 6:
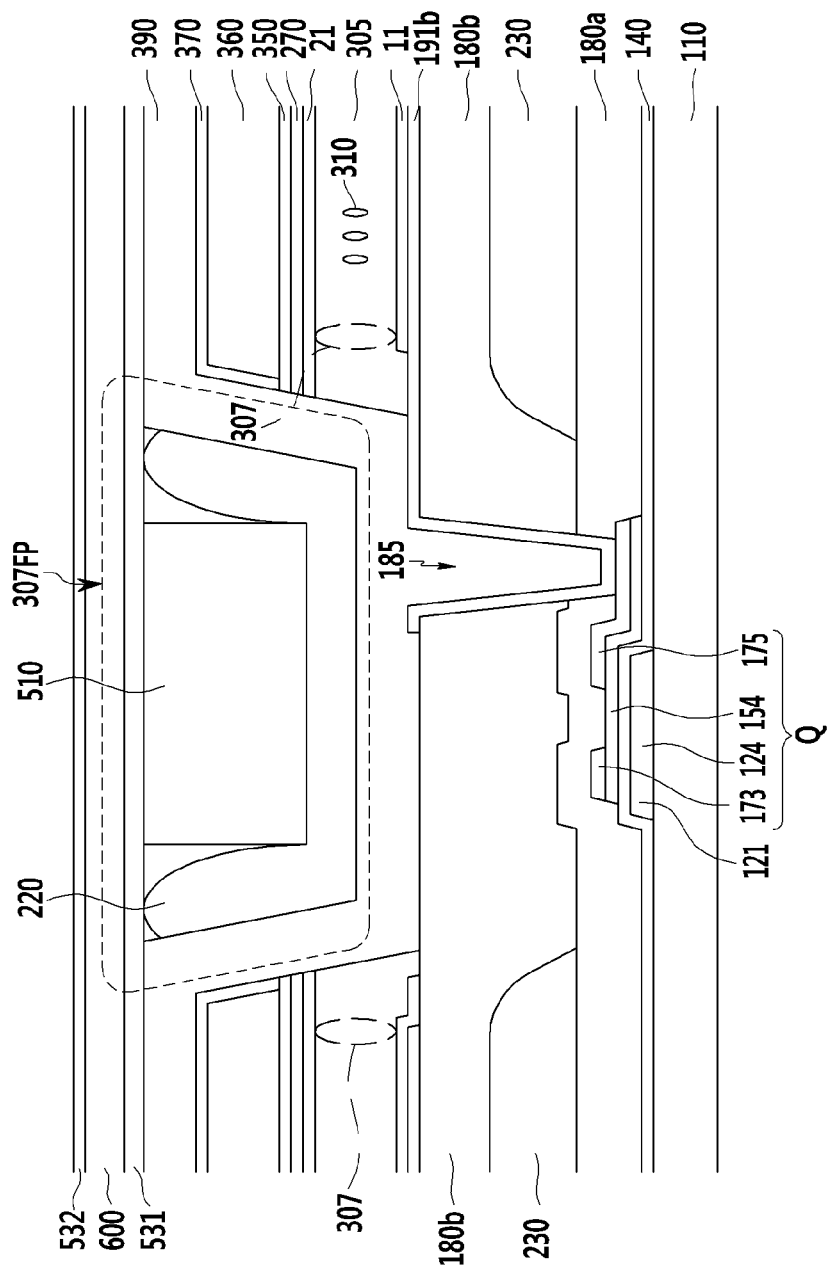
FIG. 6 is a cross-sectional view of a liquid crystal display according to an exemplary embodiment.
Figure 7:
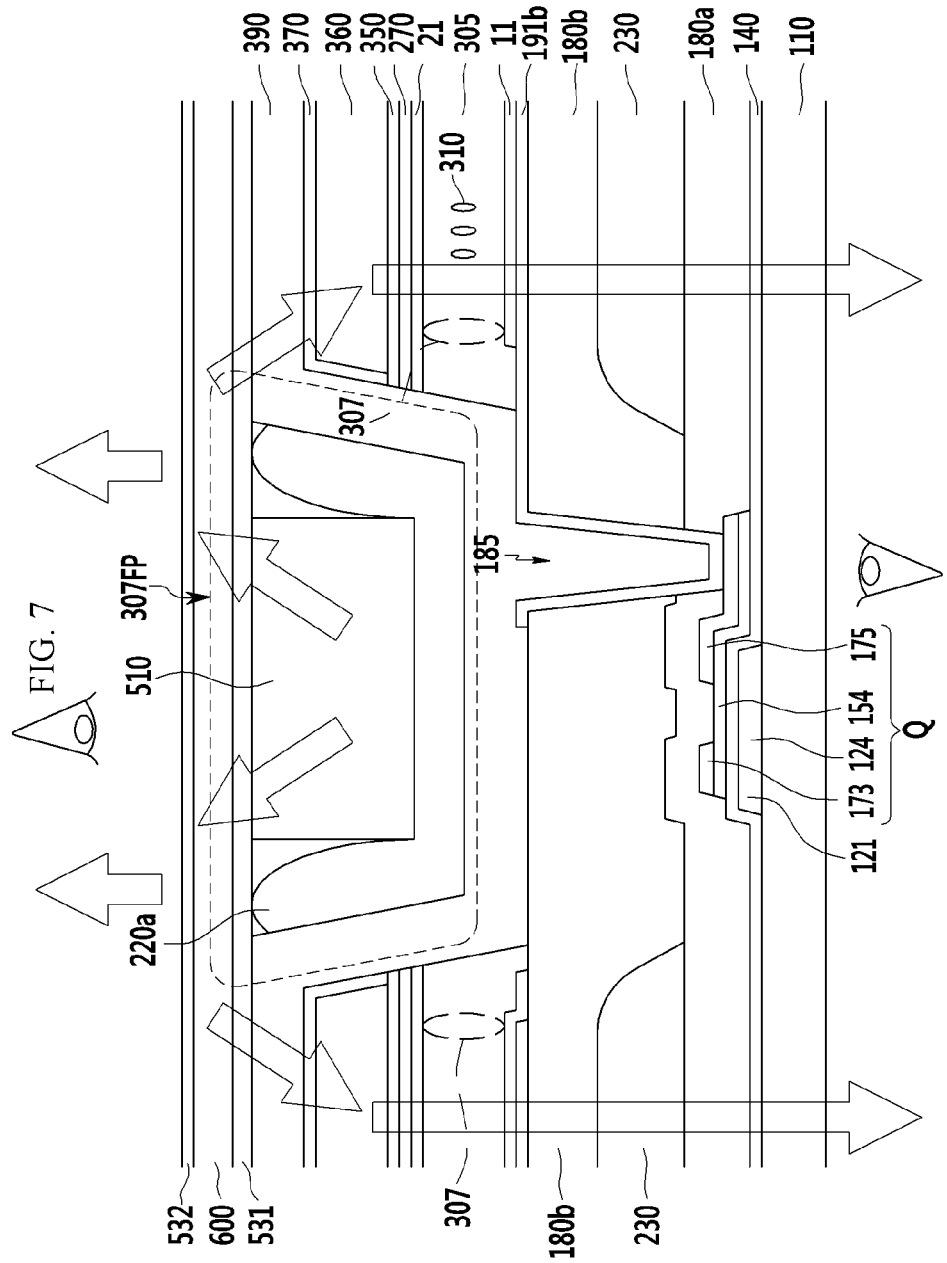
FIG. 7 is a view to explain a movement path of light in FIG. 6.

Next, the liquid crystal display according to an exemplary embodiment as a modified exemplary embodiment will be described with reference to FIG. 6 and FIG. 7. The description of the same constituent elements as the previous exemplary embodiment is omitted. FIG. 6 is a cross-sectional view of a liquid crystal display according to an exemplary embodiment, and FIG. 7 is a view to explain a movement path of a light in FIG. 6. Referring to FIG. 6, the liquid crystal display according to an exemplary embodiment may further include diffuser sheets 531 and 532 for scattering the light emitted from the light source 510 and irradiated through the light guide panel 600. In this case, the diffuser sheets includes a first diffuser sheet 531 positioned on a light path in a space between the light source 510 and the light guide panel 600 and a second diffuser sheet 532 positioned on the light guide panel 600. The diffuser sheets 531 and 532 scatter the light emitted from the light source 510 and irradiated through the light guide panel 600.

The diffuser sheets 531 and 532 may include at least one of a transparent silicon, polycarbonate, and an acryl resin (PMMA) material. The diffuser sheet 531 may be made of a soft material, and the exemplary embodiment discloses, for example, a silicon material and the like, but is not limited thereto and any material that enables a light cycle may be used.

The liquid crystal display according to the present exemplary embodiment is formed with the diffuser sheets 531 and 532 on and under the light guide panel 600. Accordingly, the light emitted from the light source 510 is not only transmitted under the liquid crystal display through the liquid crystal layer and the color filter 230 along the first diffuser sheet 531 formed under the light guide panel 600, but is also transmitted on the liquid crystal display along the second diffuser sheet 532 formed on the light guide panel 600. In the present exemplary embodiment, a viewer may view the display device in a direction from the lower side of the substrate 110 toward the upper side and a direction from the upper side of the substrate 100 toward the lower side.

Referring to FIG. 7, the light emitted from the light source 510 is first scattered through the first diffuser sheet 531. The light scattered through the first diffuser sheet 531 is emitted to a side of the display device through the light guide panel 600. The light leaked in the upper side of the display device is scattered by the second diffuser sheet 532 formed on the light guide panel 600 to be uniformly emitted in the opposite side of the display device.

Hereafter, an exemplary embodiment manufacturing the above described liquid crystal display will be described with reference to FIG. 8 to FIG. 21. The exemplary embodiment may be modified with a variation as an exemplary embodiment of the manufacturing method. FIG. 8 to FIG. 21 are cross-sectional views showing a manufacturing method of a liquid crystal display according to an exemplary embodiment. FIG. 8, FIG. 10, FIG. 12, FIG. 14, FIG. 15, FIG. 17, FIG. 19, and FIG. 21 sequentially show the cross-sectional views taken along the line II-II of FIG. 1, and FIG. 9, FIG. 11, FIG. 13, FIG. 16 FIG. 18, and FIG. 20 sequentially show the cross-sectional views taken along the line III-III of FIG. 1.

Figure 8:
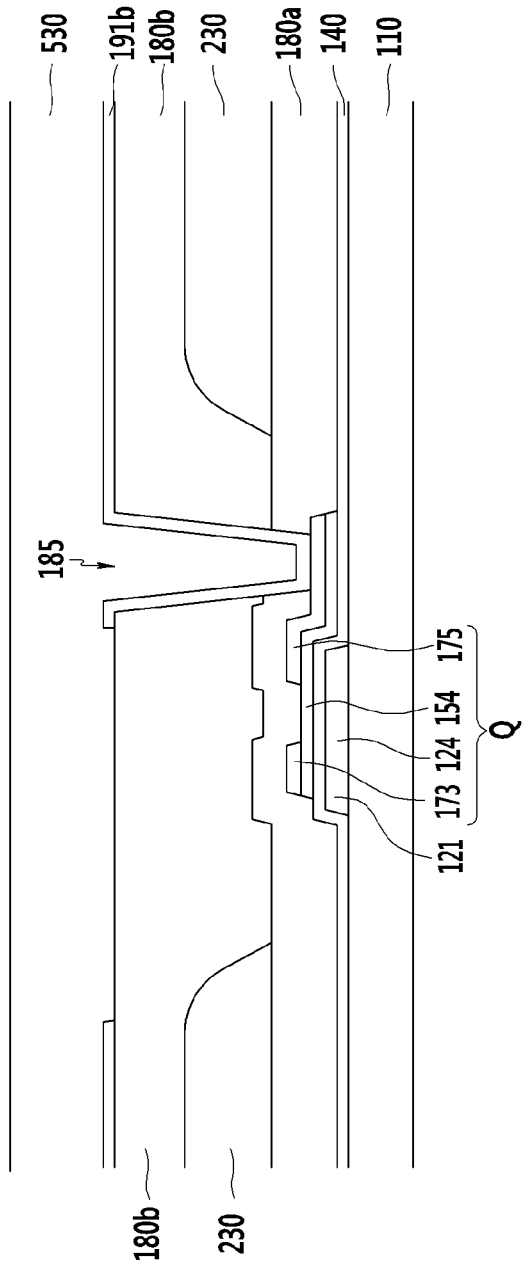
FIG. 8 to FIG. 21 are cross-sectional views showing a manufacturing method of a liquid crystal display according to an exemplary embodiment.
Figure 9:
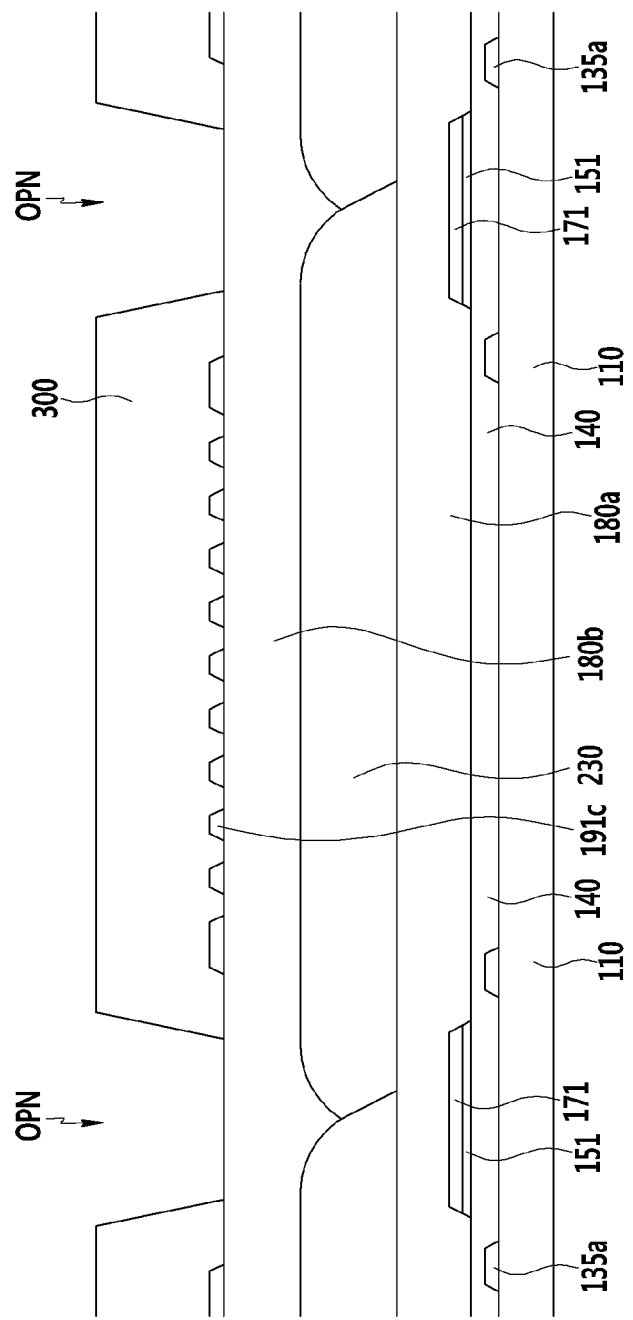

Referring to FIG. 1, FIG. 8, and FIG. 9, a switching element is formed on a substrate 110. The switching element includes a gate line 121 extending in a horizontal direction, a gate insulating layer 140 formed on the gate line 121, semiconductor layers 151 and 154 formed on the gate insulating layer 140, and a source electrode 173 and a drain electrode 175. The data line 171 connected to the source electrode 173 may be formed to extend in a vertical direction while crossing the gate line 121. The first interlayer insulating layer 180a is formed on the data conductors including the source electrode 173, the drain electrode 175, and the data line 171, and on the exposed portion of the semiconductor layer 154. A color filter 230 is formed on the first interlayer insulating layer 180a at a position corresponding to the pixel area. A second interlayer insulating layer 180b covering the color filter 230 is formed on the color filter 230, and the second interlayer insulating layer 180b has a contact hole 185 to physically and electrically connect the pixel electrode 191 and the drain electrode 175.

Next, a pixel electrode 191 is formed on the second interlayer insulating layer 180b, and a sacrificial layer 300 is formed on the pixel electrode 191. In the sacrificial layer 300, as shown in FIG. 7, an open part OPN is formed along the data line 171. In the open part OPN, the common electrode 270, the lower insulating layer 350, the roof layer 360, and the upper insulating layer 370 are filled in the following process, thereby forming the partition wall part PWP.

Figure 10:
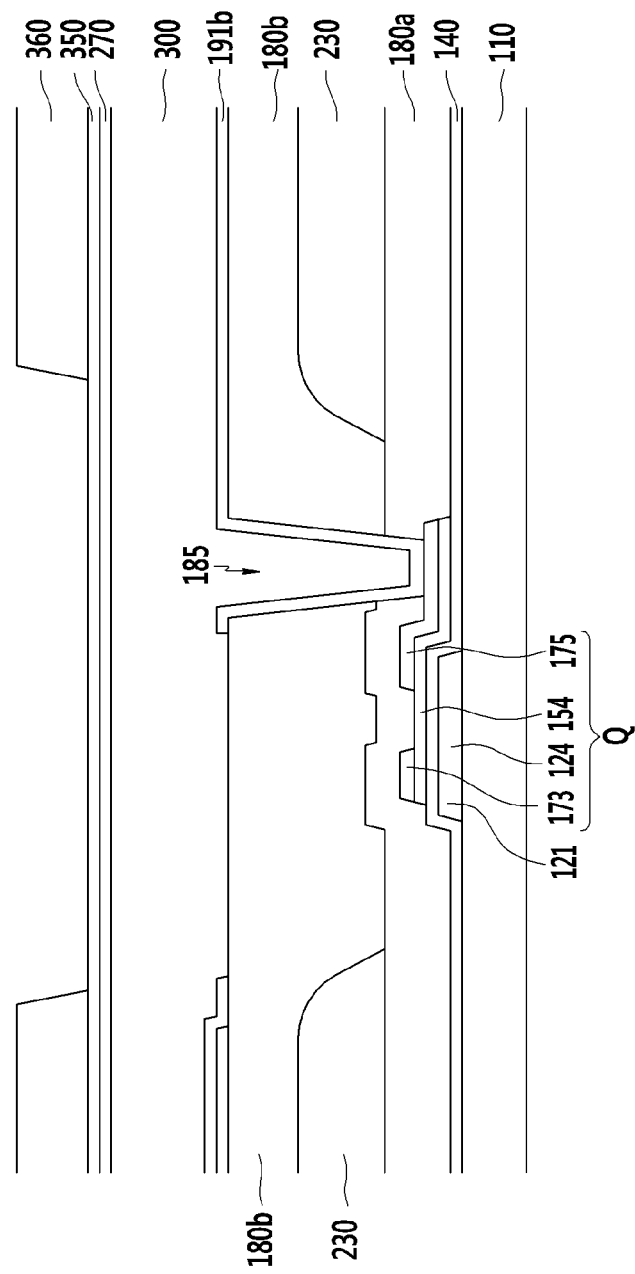
Figure 11:
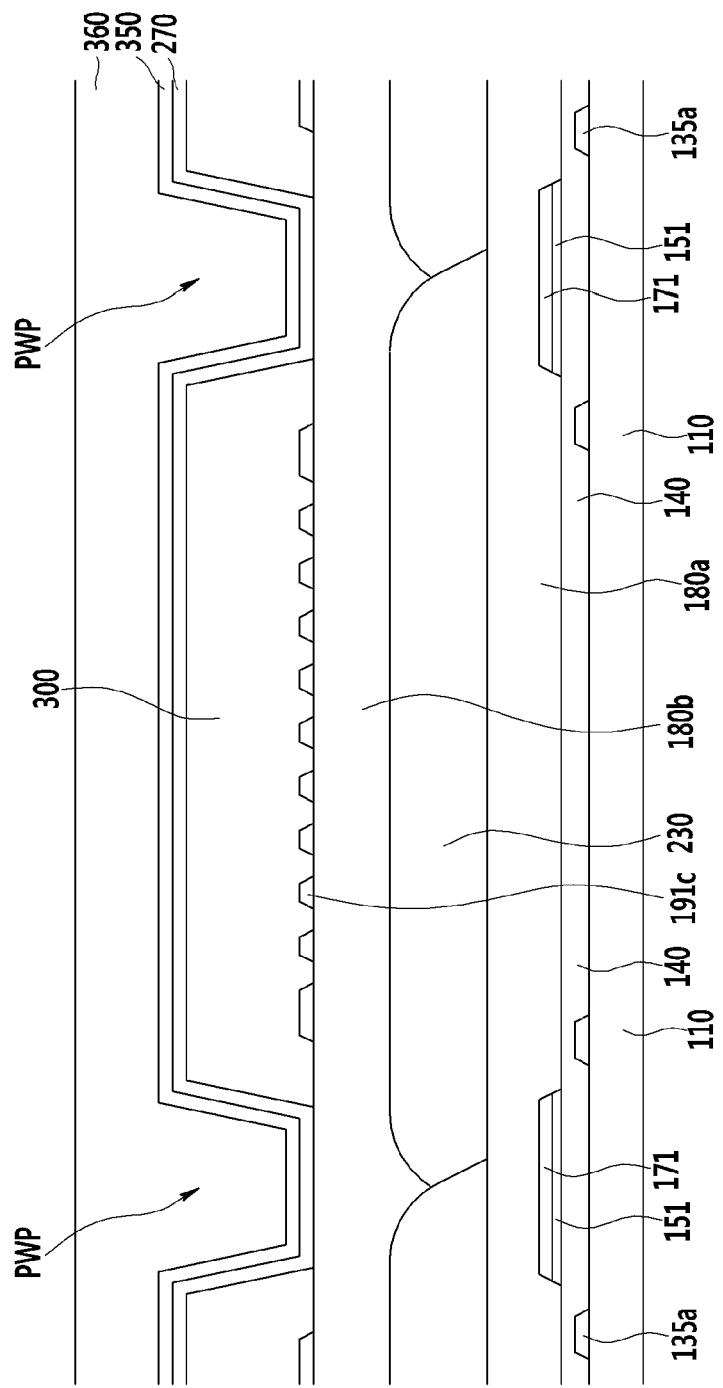

Referring to FIG. 10 and FIG. 11, a common electrode 270, a lower insulating layer 350, and a roof layer 360 are sequentially formed on the sacrificial layer 300. The roof layer 360 may be removed at a region corresponding to the light blocking member 220 positioned between pixel areas adjacent in the vertical direction by an exposure and development process. The roof layer 360 exposes the lower insulating layer 350 in a region corresponding to the light blocking member 220. The common electrode 270, the lower insulating layer 350, and the roof layer 360 fill the open part OPN formed on the data line 171, as shown in FIG. 9, thereby forming the partition wall part PWP.

Figure 12:
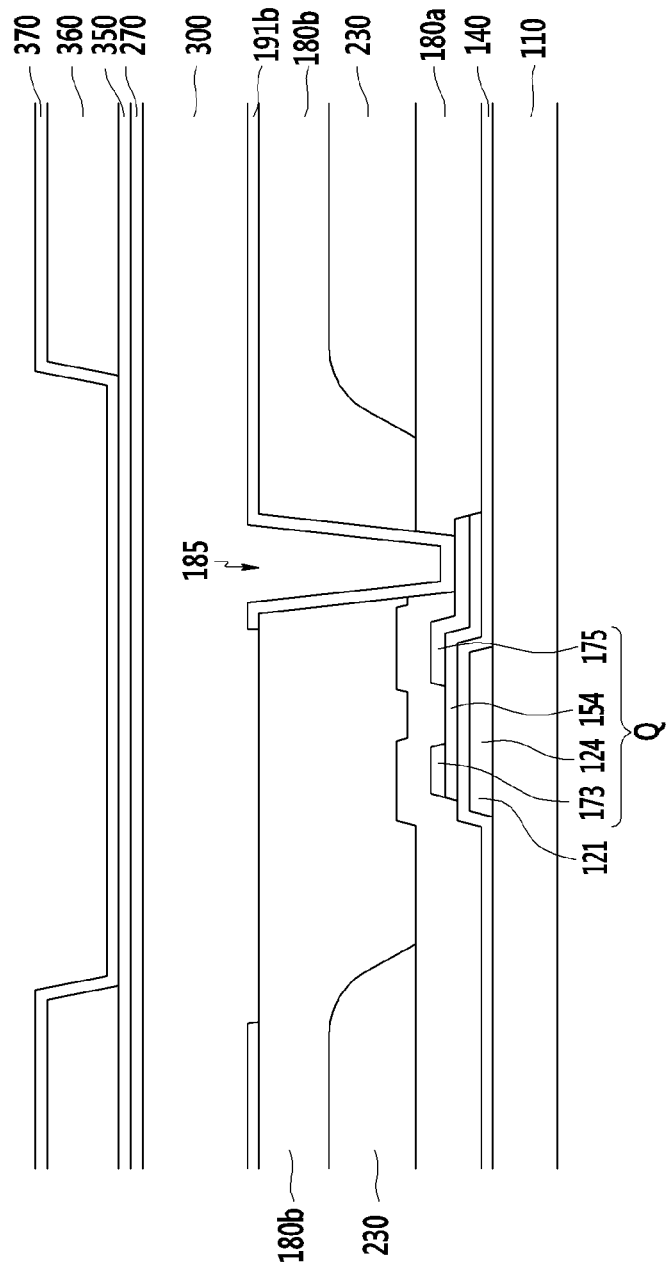
Figure 13:
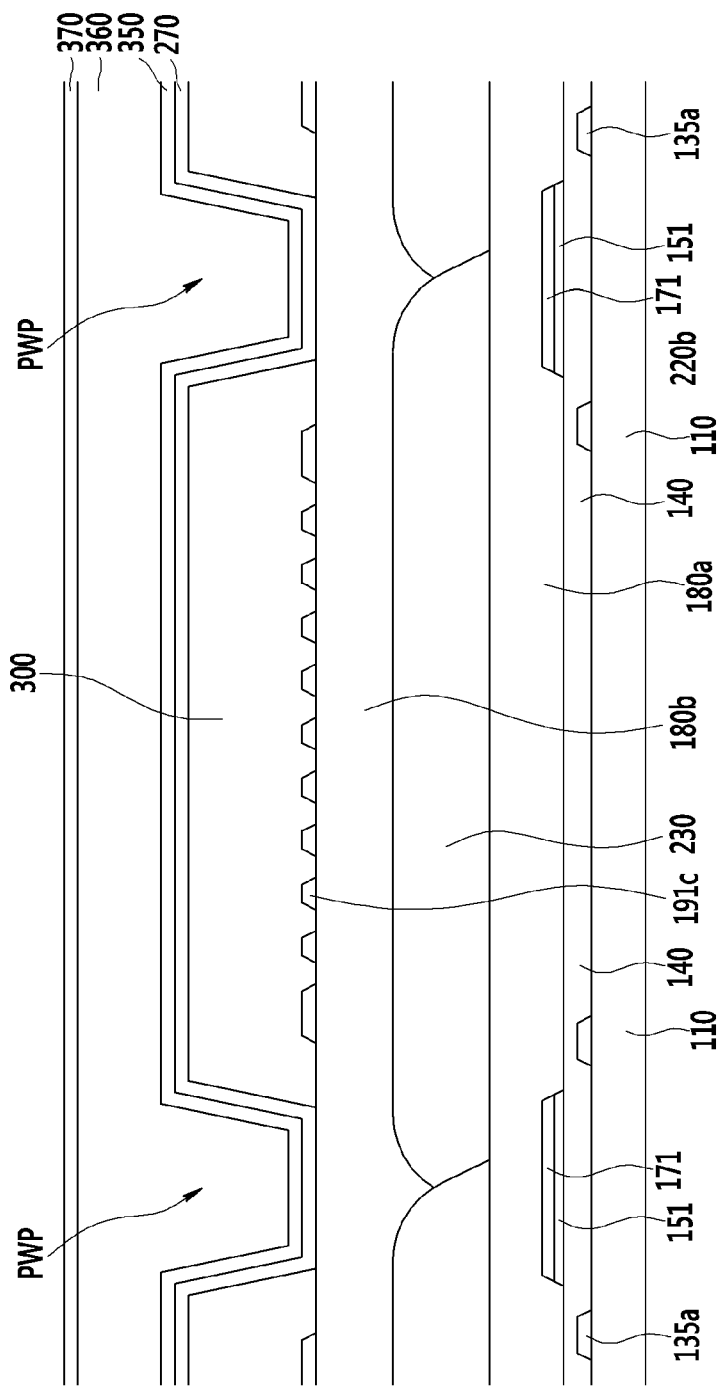
Figure 14:
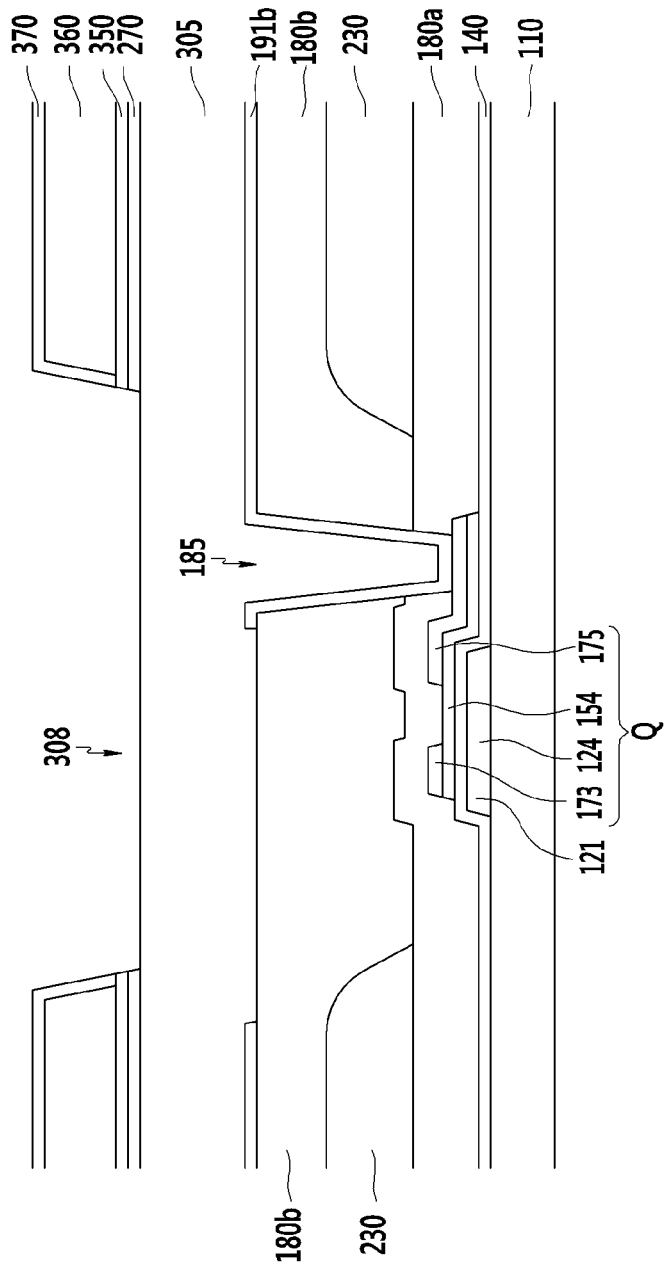
Figure 19:
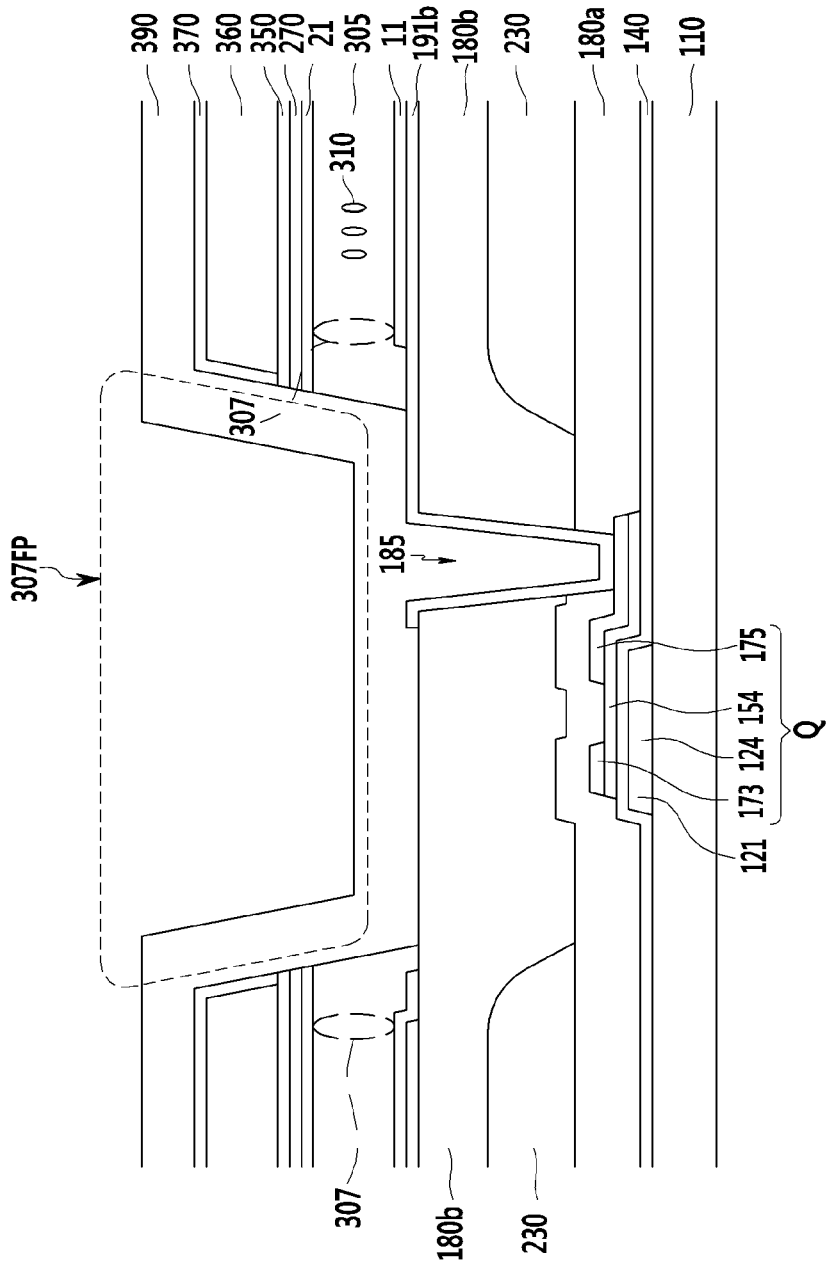

Referring to FIG. 12 and FIG. 19, the upper insulating layer 370 is formed to cover the roof layer 360 and the exposed lower insulating layer 350. Referring to FIG. 14, the upper insulating layer 370, the lower insulating layer 350, and the common electrode 270 are etched to partially remove the upper insulating layer 370, the lower insulating layer 350, and the common electrode 270, thereby forming a trench 308. The upper insulating layer 370 may have a structure covering the side of the roof layer 360, but is not limited thereto, and the upper insulating layer 370 covering the side of the roof layer 360 may be removed to expose a side of the roof layer 360.

Figure 15:
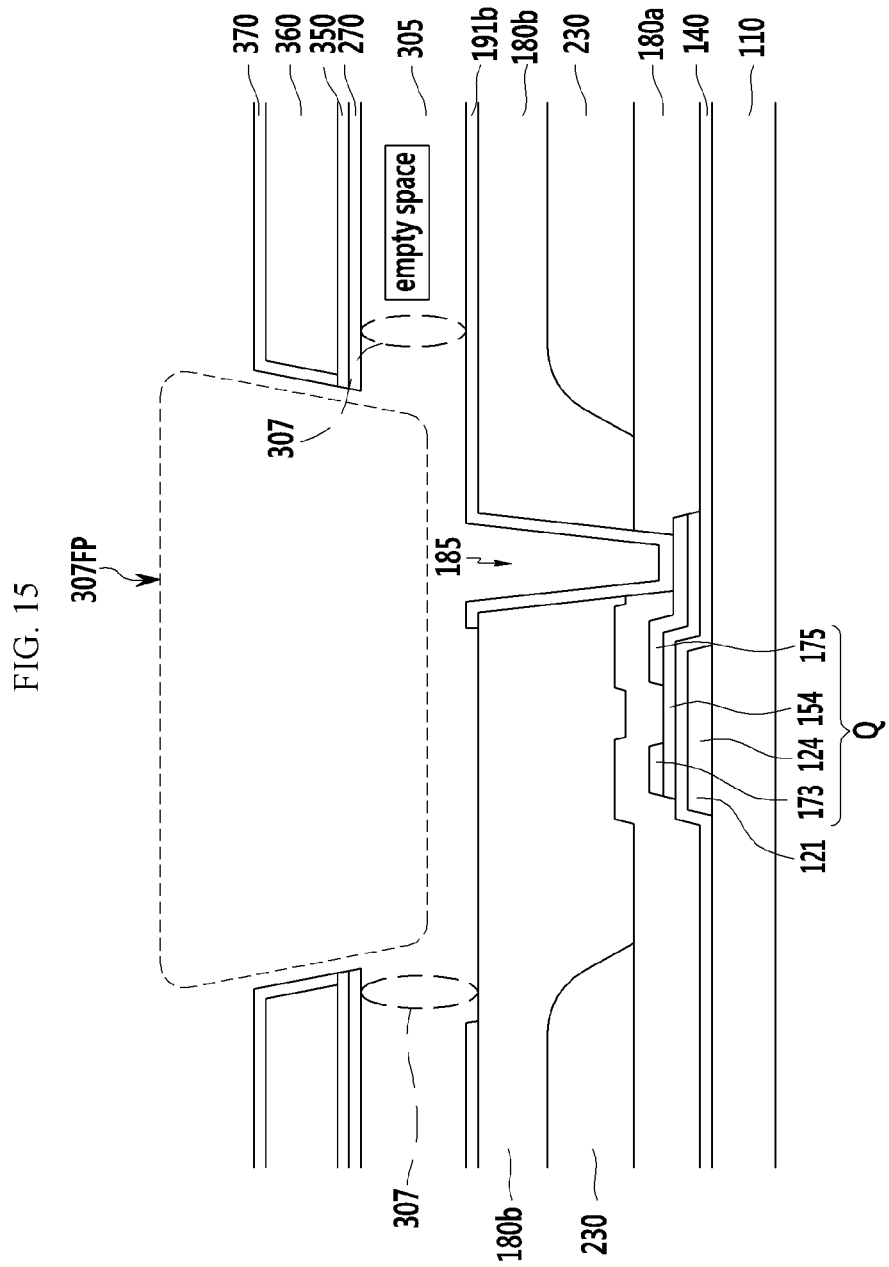
Figure 16:
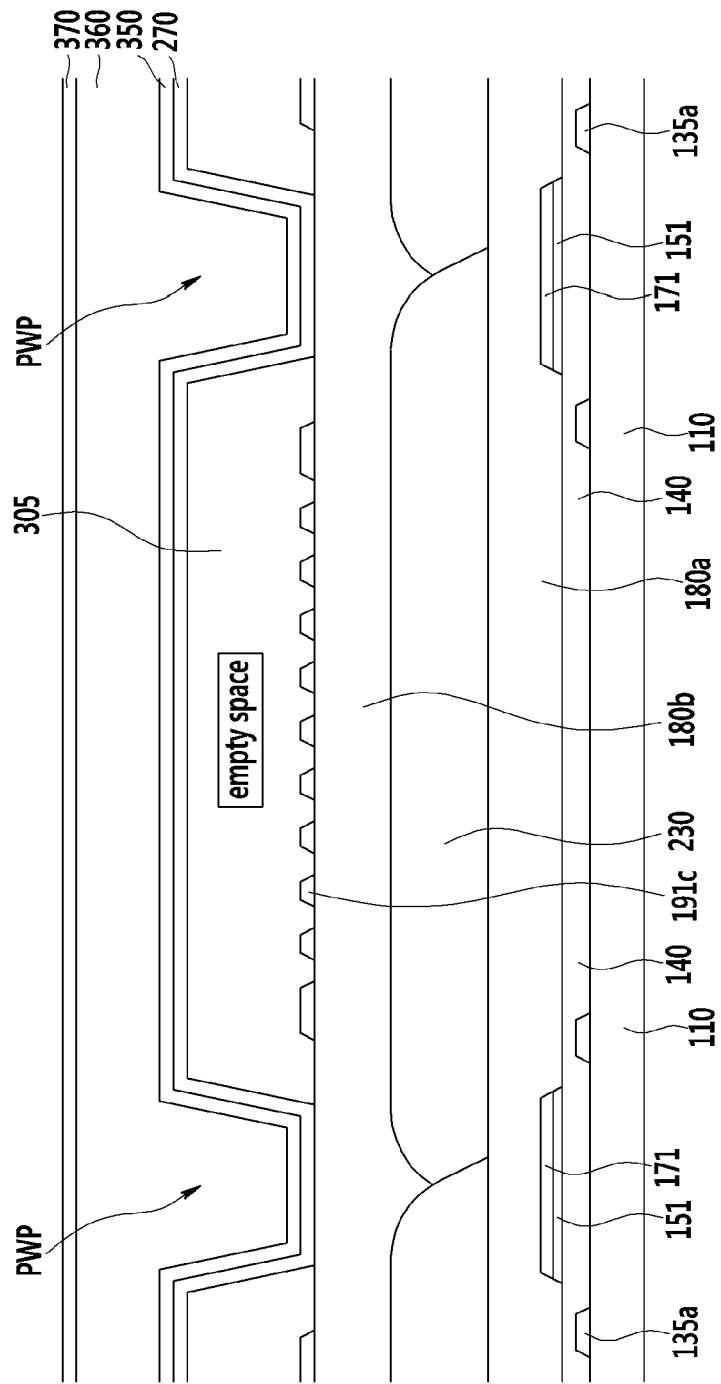

Referring to FIG. 15 and FIG. 16, the sacrificial layer 300 is removed by an oxygen (O2) ashing process or a wet-etching process through the liquid crystal injecting parts 307FP. When the sacrificial layer 300 is removed, a microcavity 305 having an inlet part 307 is formed. The inlet part 307 may be formed along a direction parallel to the gate line 121.

Figure 17:
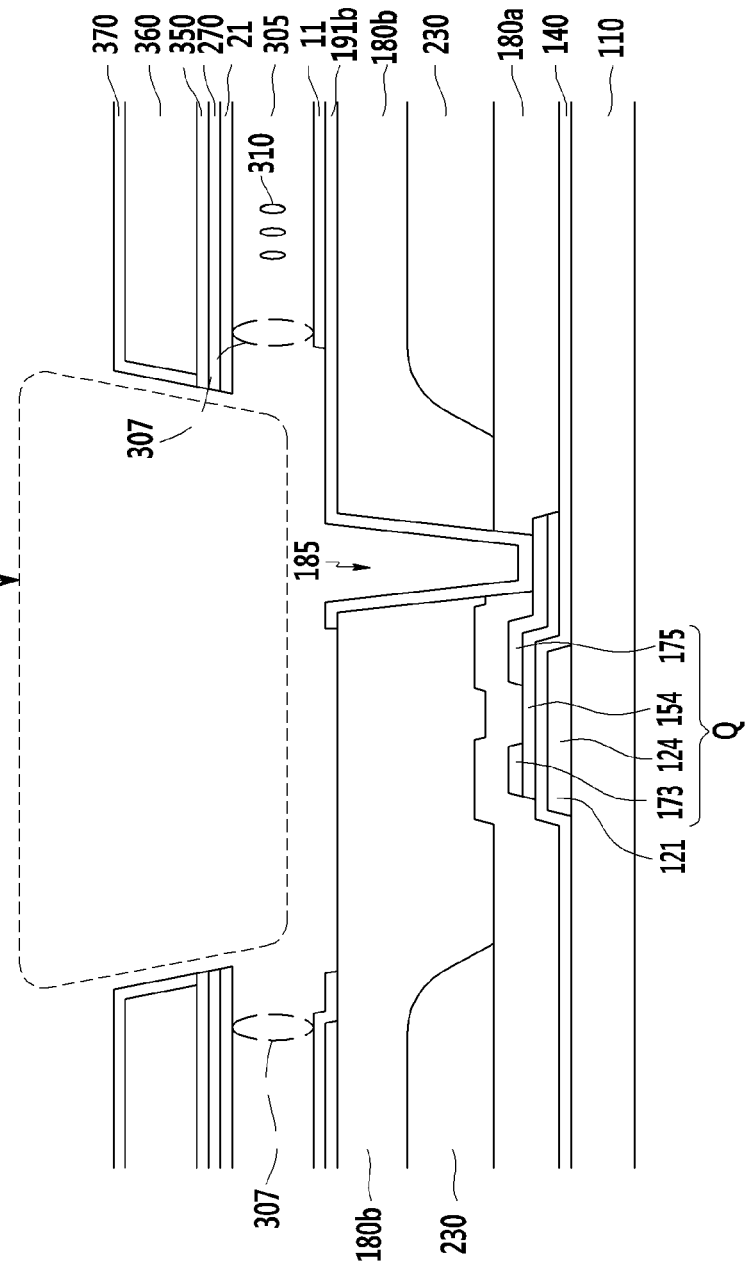
Figure 18:
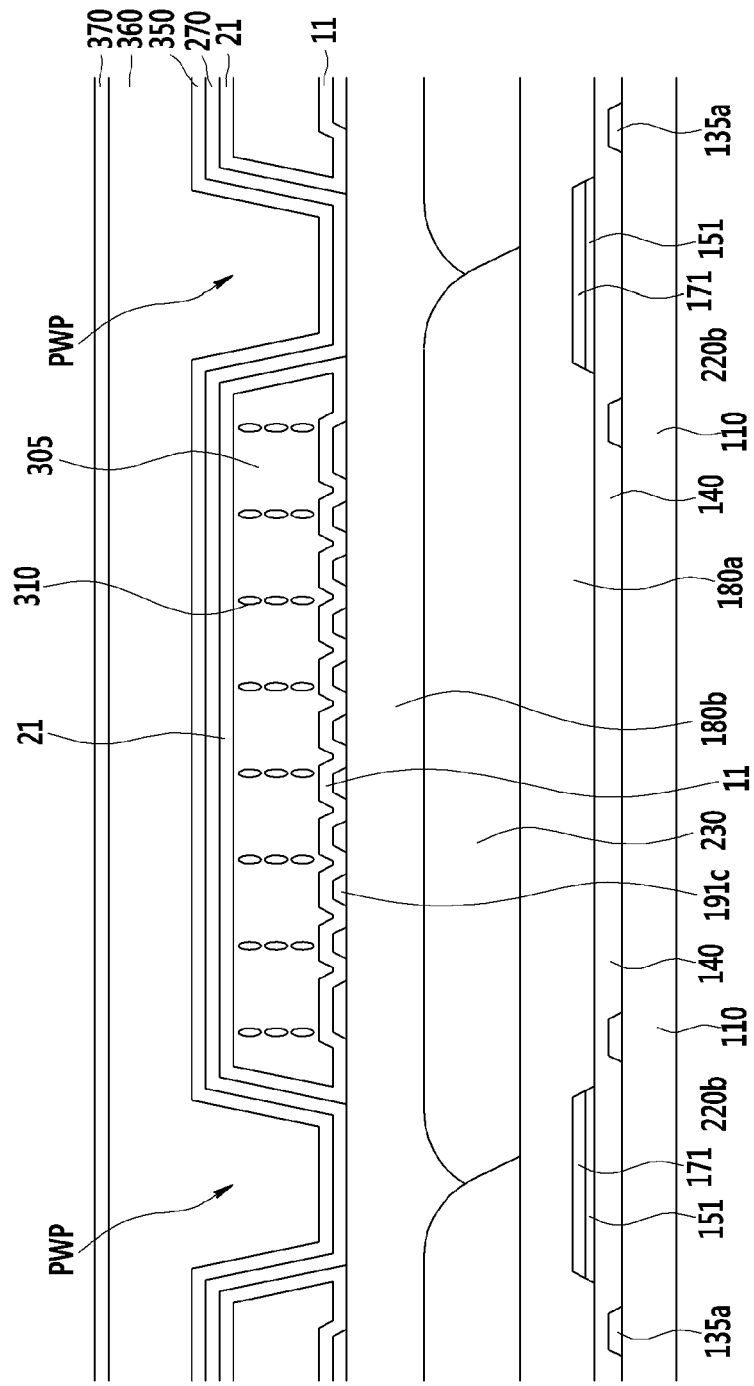

Referring to FIG. 17 to FIG. 18, an alignment material is injected through the inlet part 307 to form alignment layers 11 and 21 on the pixel electrode 191 and the common electrode 270. A bake process may be performed after injecting an alignment material including a solid content and a solvent through the inlet part 307.

Next, a liquid crystal material is injected to the liquid crystal injecting parts 307FP by using an inkjet process. The liquid crystal material including the liquid crystal molecule 310 may enter into the microcavities 305 through the inlet part 307 by a capillary force, or the like.

Figure 20:
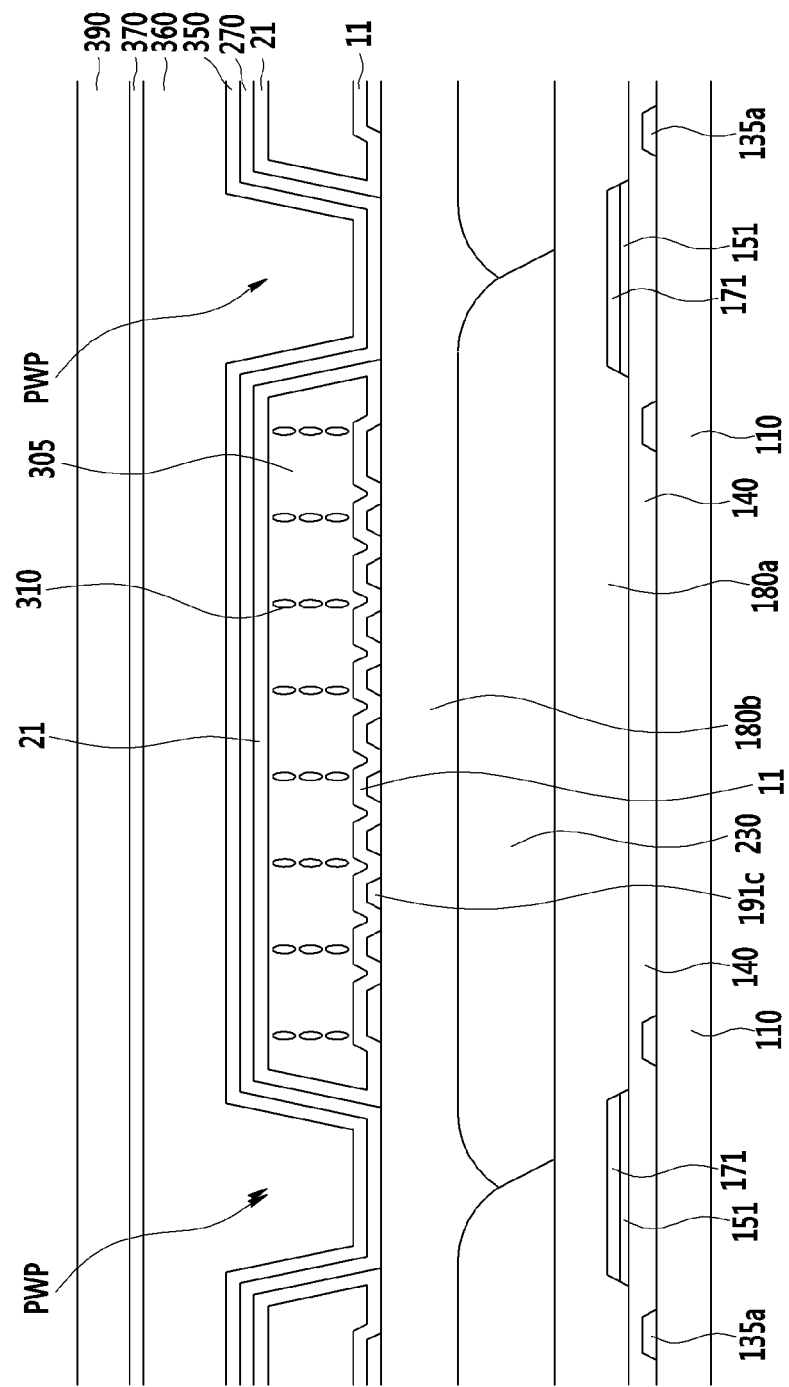

Referring to FIG. 19 to FIG. 20, a capping layer 390 covering the inlet part 307 and the liquid crystal injecting parts 307FP is formed on the upper insulating layer 370. The capping layer 390 extends from the upper insulating layer 370 to the trench 308, thereby forming a depressed structure. A light source that will be described later may be formed at a position at which the depressed structure is formed.

Figure 21:
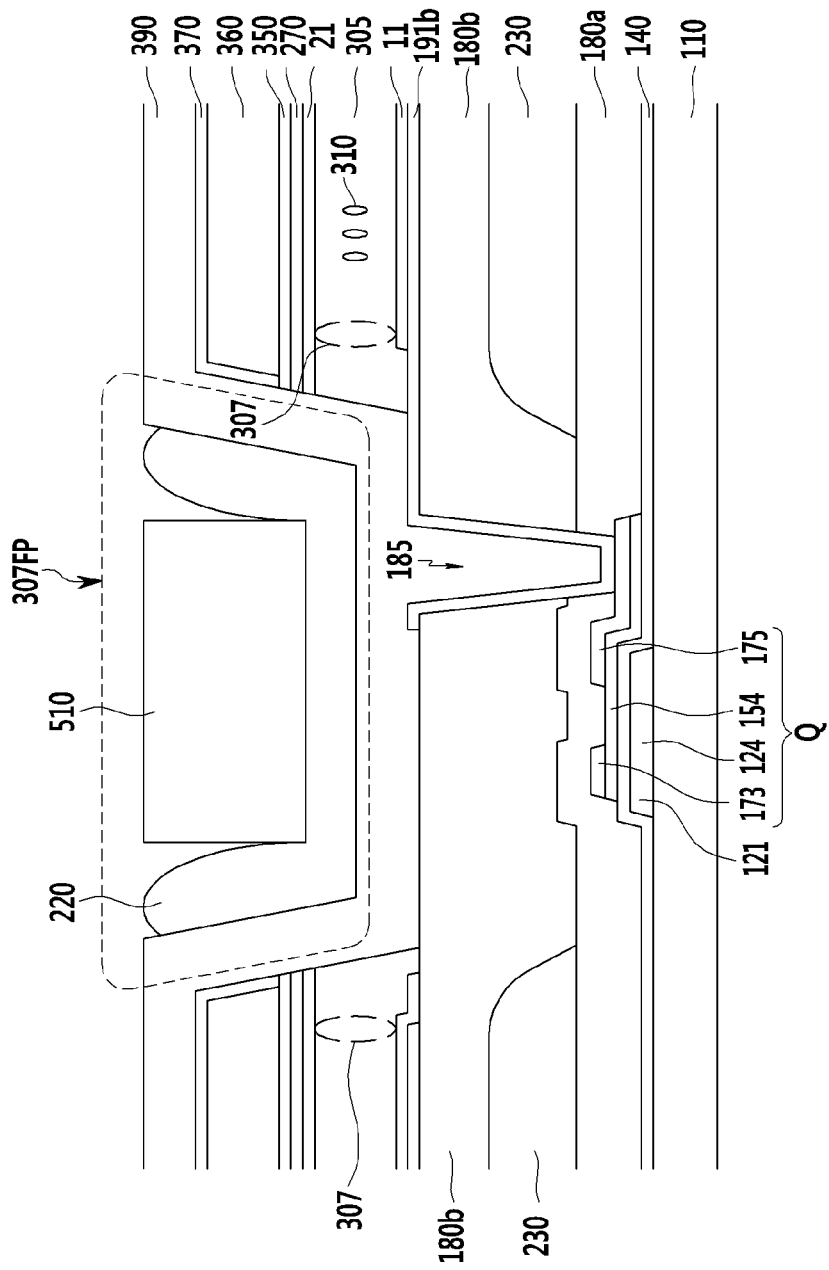

Referring to FIG. 21, the light blocking member 220 and the light source 510 are formed on the capping layer 390. The light blocking member 220 may be formed along a direction parallel to the gate line 121, and may be made of a material through which light is not passed.

Next, the light source 510 is formed at a position corresponding to the liquid crystal injecting parts 307FP in which the trench 308 is formed between the microcavities 305 adjacent in the horizontal direction. In the present exemplary embodiment, the light source 510 may be formed on the light blocking member 220.

When forming a curved display device in which the light source 510 is formed under the substrate 110, the thickness of the display device may be increased. The increase in the thickness may apply an increased tension force to the display device that may cause a damage to the display device. Further, an edge type display device in which the light source is disposed on an edge side of the light guide panel 600 is difficult to apply to the large-sized display.

The manufacturing method of the liquid crystal display according to an exemplary embodiment positions the light source 510 between the microcavities 305 formed on the substrate 110 allowing the thickness of the liquid crystal display to be reduced. The reduce tension force applied to the display device makes the display device adequate to apply to the large-sized display.

The liquid crystal display described in FIG. 1 to FIG. 3 may be formed by forming the diffuser sheets 531 and 532, the light guide panel 600, and the reflection sheet 520 to cover the capping layer 390 and the light source 510.

While the present disclosure has been described in connection with exemplary embodiments, it is to be understood that the present disclosure is not limited to the disclosed embodiments, but, on the contrary, is intended to cover various modifications and equivalent arrangements included within the spirit and scope of the present disclosure.

DESCRIPTION OF SYMBOLS

| 220 | light blocking member | 300 | sacrificial layer |
|---|---|---|---|
| 305 | microcavity | 307 | inlet part |
| 307FP | liquid crystal injecting parts | 308 | trench |
| 360 | roof layer | 390 | capping layer |
| 510 | light source | 600 | light guide |
| 531, 532 | diffuser sheet | 520 | reflection sheet |

What is claimed is:
1. A liquid crystal display comprising:
a substrate;
a liquid crystal layer positioned on the substrate and formed with a plurality of microcavities including liquid crystal molecules;
a roof layer positioned on the liquid crystal layer;
a capping layer positioned on the roof layer; and
a light source positioned on the capping layer and positioned between the plurality of microcavities.

2. The liquid crystal display of claim 1, further comprising a light guide panel covering the light source and the capping layer.

3. The liquid crystal display of claim 2, further comprising:
   a diffuser sheet positioned between the light source and the light guide panel; and
   a reflection sheet formed on the light guide panel.

4. The liquid crystal display of claim 1, further comprising a light blocking member positioned between the capping layer and the light source.

5. The liquid crystal display of claim 2, wherein the light guide panel is patterned at a position corresponding to the light source.

6. The liquid crystal display of claim 2, further comprising:
   a first diffuser sheet positioned between the light source and the light guide panel; and
   a second diffuser sheet formed on the light guide panel.

7. The liquid crystal display of claim 1, further comprising:
   a thin film transistor positioned on the substrate;
   a pixel electrode connected to the thin film transistor;
   an upper insulating layer positioned on the roof layer; and
   a lower insulating layer positioned under the roof layer and facing the pixel electrode based on the microcavities.

8. The liquid crystal display of claim 7, wherein
   the light source is formed along a liquid crystal inlet formed along a direction that a gate line connected to the thin film transistor extends.

9. A method for manufacturing a liquid crystal display comprising:
   forming a thin film transistor on a substrate;
   forming a pixel electrode on the thin film transistor;
   forming a sacrificial layer on the pixel electrode;
   forming a roof layer on the sacrificial layer;
   removing the sacrificial layer to form a plurality of microcavities;
   injecting a liquid crystal material into the plurality of microcavities;
   forming a capping layer covering a liquid crystal inlet formed between the plurality of microcavities; and
   forming a light source positioned on the capping layer and disposed in a liquid crystal inlet formed between the plurality of microcavities.

10. The method of claim 9, further comprising forming a light guide panel covering the light source and the capping layer.

11. The method of claim 10, wherein:
    forming a diffuser sheet between the light source and the capping layer before forming the light guide panel.

12. The method of claim 10, further comprising
    forming a reflection sheet on the light guide panel after forming the light guide panel.

13. The method of claim 10, further comprising:
    forming a first diffuser sheet on the light source and the capping layer before forming the light guide panel; and
    forming a second diffuser sheet on the light guide panel after forming the light guide panel.

14. The method of claim 9, further comprising
    forming a light blocking member positioned on the capping layer and facing the liquid crystal inlet formed between the plurality of microcavities after forming the capping layer.

15. The method of claim 9, wherein
    the liquid crystal inlet is formed along a direction in which a gate line connected to the thin film transistor extends.

\* \* \* \* \*